United States Patent
Kim et al.

(10) Patent No.: US 10,296,326 B2
(45) Date of Patent: May 21, 2019

(54) METHOD AND SYSTEM FOR IDENTIFYING OPEN-SOURCE SOFTWARE PACKAGE BASED ON BINARY FILES

(71) Applicant: INSIGNARY INC., Seoul (KR)

(72) Inventors: Younggon Kim, Anyang-si (KR); Tae-Jin Kang, Seoul (KR); Si Haeng Cho, Seoul (KR)

(73) Assignee: INSIGNARY INC., Seoul (KR)

( * ) Notice: Subject to any disclaimer, the term of this patent is extended or adjusted under 35 U.S.C. 154(b) by 0 days.

(21) Appl. No.: 15/884,901

(22) Filed: Jan. 31, 2018

(65) Prior Publication Data

US 2019/0102165 A1 Apr. 4, 2019

(30) Foreign Application Priority Data

Sep. 29, 2017 (KR) .......................... 10-2017-0127693

(51) Int. Cl.
*G06F 8/70* (2018.01)
*G06F 16/13* (2019.01)
(Continued)

(52) U.S. Cl.
CPC .............. *G06F 8/70* (2013.01); *G06F 16/137* (2019.01); *G06F 16/152* (2019.01); *G06F 8/36* (2013.01)

(58) Field of Classification Search
None
See application file for complete search history.

(56) References Cited

U.S. PATENT DOCUMENTS 7,552,093 B2 * 6/2009 Levin ..................... G06Q 10/10
                                                                    705/51
7,797,245 B2 * 9/2010 Pedersen ................. G06F 21/10
                                                                    705/59
(Continued)

FOREIGN PATENT DOCUMENTS

JP    2010067216    3/2010
JP    2017097843    6/2017
(Continued)

OTHER PUBLICATIONS

International Search Report—PCT/KR2018/007955 dated Oct. 12, 2018.

(Continued)

*Primary Examiner* — Matthew J Brophy
(74) *Attorney, Agent, or Firm* — Cantor Colburn LLP

(57) ABSTRACT

The present disclosure provides a method and system for identifying an open-source software package from a binary file for which an open-source license is to be checked. The method includes: accessing an open-source database generated to include a plurality of reference binary files and a plurality of reference open-source software packages having a plurality of reference open-source files, based on a plurality of first hash values extracted from the plurality of reference binary files generated from the plurality of reference open-source files; receiving the target binary file; extracting a plurality of second hash values including at least two general hash values from the target binary file; extracting at least two first hash values corresponding to the plurality of second hash values among the plurality of first hash values; and identifying a reference open-source software package corresponding to the at least two first hash values based on the open-source database.

24 Claims, 5 Drawing Sheets

| COLUMN | EXPLANATION |
|---|---|
| PACKAGE | REFERENCE OPEN-SOURCE SOFTWARE PACKAGE NAME |
| VERSION | REFERENCE OPEN-SOURCE SOFTWARE PACKAGE VERSION INFORMATION |
| FILE | REFERENCE BINARY FILE NAME |
| HASH | FIRST HASH VALUE |

(51) Int. Cl.
*G06F 16/14* (2019.01)
*G06F 8/36* (2018.01)

(56) References Cited

U.S. PATENT DOCUMENTS

| | | | | |
|---|---|---|---|---|
| 7,904,884 | B2* | 3/2011 | Brown | G06F 21/6209 |
| | | | | 713/184 |
| 8,010,538 | B2* | 8/2011 | Pedersen | G06F 16/30 |
| | | | | 707/749 |
| 8,010,803 | B2* | 8/2011 | Pedersen | G06F 21/602 |
| | | | | 713/153 |
| 8,108,315 | B2* | 1/2012 | Krawetz | G06F 21/121 |
| | | | | 705/51 |
| 8,359,655 | B1* | 1/2013 | Pham | G06F 21/12 |
| | | | | 370/486 |
| 8,479,161 | B2* | 7/2013 | Weigert | G06F 11/3604 |
| | | | | 717/124 |
| 8,589,306 | B1* | 11/2013 | Morriss | G06Q 50/184 |
| | | | | 705/59 |
| 8,875,301 | B2* | 10/2014 | Lori | G06F 21/105 |
| | | | | 705/51 |
| 9,223,554 | B1* | 12/2015 | Lawson | G06F 8/54 |
| 9,298,451 | B2* | 3/2016 | Kaneko | G06F 8/71 |
| 9,436,463 | B2* | 9/2016 | Sass | G06F 8/751 |
| 9,648,032 | B2* | 5/2017 | Davydov | H04L 63/1416 |
| 9,720,925 | B1* | 8/2017 | Lawson | G06F 8/54 |
| 2005/0216898 | A1* | 9/2005 | Powell, Jr. | G06F 8/36 |
| | | | | 717/141 |
| 2006/0116966 | A1* | 6/2006 | Pedersen | G06F 21/10 |
| | | | | 705/59 |
| 2007/0168940 | A1* | 7/2007 | Lunawat | G06F 8/71 |
| | | | | 717/108 |
| 2007/0260651 | A1* | 11/2007 | Pedersen | G06F 16/30 |
| 2007/0271190 | A1* | 11/2007 | Foster | G06F 21/105 |
| | | | | 705/59 |
| 2010/0185686 | A1 | 7/2010 | Weigert et al. | |
| 2010/0241469 | A1* | 9/2010 | Weigert | G06F 8/75 |
| | | | | 717/124 |
| 2011/0307876 | A1* | 12/2011 | Ottoni | G06F 8/441 |
| | | | | 717/153 |
| 2015/0193122 | A1* | 7/2015 | Liu | G06F 17/2705 |
| | | | | 715/739 |
| 2015/0249710 | A1* | 9/2015 | Stefansson | G06F 21/10 |
| | | | | 709/217 |
| 2015/0363294 | A1* | 12/2015 | Carback, III | G06F 8/37 |
| | | | | 717/132 |
| 2016/0099956 | A1* | 4/2016 | Amit | H04L 63/1416 |
| | | | | 726/23 |
| 2016/0202972 | A1* | 7/2016 | Sass | G06F 8/751 |
| | | | | 717/121 |
| 2017/0093893 | A1* | 3/2017 | Davydov | H04L 63/1416 |
| 2017/0344352 | A1* | 11/2017 | Peterson | G06F 8/75 |

FOREIGN PATENT DOCUMENTS

| | | |
|---|---|---|
| KR | 101472321 | 12/2014 |
| KR | 20150051508 | 5/2015 |
| KR | 101725450 | 4/2017 |
| KR | 20170079961 | 7/2017 |

OTHER PUBLICATIONS

Cabezas, et al., Detecting Source Code Re-Use through a Binary Analysis Hybrid Approach, Forensic Magazine, 2013, pp. 1-10.
Korean Office Action - Korean Application No. Oct. 2017-0127693 dated Jan. 21, 2019, citing U.S. Appl. No. 2010/0185686, Cabezas and KR 10-2017-0079961.

* cited by examiner

| COLUMN | EXPLANATION |
|---|---|
| PACKAGE | REFERENCE OPEN-SOURCE SOFTWARE PACKAGE NAME |
| VERSION | REFERENCE OPEN-SOURCE SOFTWARE PACKAGE VERSION INFORMATION |
| FILE | REFERENCE BINARY FILE NAME |
| HASH | FIRST HASH VALUE |

FIG. 6

| SECOND HASH VALUE | FIRST HASH VALUE | SIMILARITY |
|---|---|---|
| SIMILARITY HASH VALUE A | SIMILARITY HASH VALUE B | 85 |
| | SIMILARITY HASH VALUE C | 80 |
| | SIMILARITY HASH VALUE D | 70 |
| | SIMILARITY HASH VALUE E | 65 |
| | SIMILARITY HASH VALUE F | 90 |

METHOD AND SYSTEM FOR IDENTIFYING OPEN-SOURCE SOFTWARE PACKAGE BASED ON BINARY FILES

CROSS-REFERENCE TO RELATED APPLICATIONS

The present application claims priority from Korean Patent Application No. 10-2017-0127693 filed on Sep. 29, 2017, the entire subject matter of which is incorporated herein by reference.

TECHNICAL FIELD

The present disclosure relates to a method and system for identifying an open-source software package based on binary files.

BACKGROUND ART

The term "open source" refers to software or a software license that allows a third party to view the source code of the software while maintaining the rights of the original author of the corresponding software or hardware. In general, the use of open-source allows joint participation, rapid prototyping, transparency in exchanging opinions, and community development of software or hardware for specific purposes. Thus, developers and businesses can quickly and stably produce software or hardware having desired functionalities by utilizing a variety of open-source software.

Like commercial software, open-source software is also subject to copyright (licensing). However, the open-source software is different from the commercial software in the manner in which the copyright is exercised, and the copyright owners of general open-source software can disclose source code (an open-source file) and exercise their rights to allow viewing, copying, installation, use, modification, and redistribution of the source code.

However, since the open-source software can be easily searched and downloaded to be used by anyone via the Internet, the use of the open-source software in violation of the copyrights of the copyright owners of the corresponding software has been increasing. Because of this, there has been used a technology to determine whether particular software has used the source code of the open-source software, or to verify open-source software licenses.

SUMMARY

License verification of open-source software may be required not only for source code, but also for other types of code (e.g., machine code, object code, and binary code/file) generated using the source code.

For example, a binary file refers to a file generated in a form that can be directly executed by a computer or a processor by compiling a file in the form of source code. However, since it is difficult for ordinary users or programmers to easily understand or identify a binary file that has been converted from the source code to a different type of code, it is difficult to verify the license that was granted to the original source code. As a result, there has been inconvenience in having to verify the license of the corresponding open-source software through the source code used to generate the binary file.

The present disclosure aims to solve difficulties in verifying licenses for other types of code converted from the source code of open-source software, as described above. In order to solve these problems, a method and system are provided for identifying a reference open-source software package corresponding to a target binary file, based on a plurality of first hash values extracted from a plurality of reference binary files generated by compiling a plurality of reference open-source files and a plurality of second hash values extracted from the target binary file.

According to one aspect of the present disclosure, there is provided a method for identifying an open-source software package from a target binary file for which an open-source license is to be checked. The method includes: accessing an open-source database generated to include a plurality of reference open-source software packages having a plurality of reference open-source files and to include a plurality of reference binary files, based on a plurality of first hash values extracted from the plurality of reference binary files generated from the plurality of reference open-source files; receiving the target binary file; extracting a plurality of second hash values including at least two general hash values from the target binary file; extracting at least two first hash values, corresponding to the plurality of second hash values, among the plurality of first hash values included in the open-source database; and identifying a reference open-source software package, corresponding to the at least two first hash values based on the open-source database, among the plurality of reference open-source software packages.

In an embodiment, each of the plurality of first hash values and the plurality of second hash values includes a plurality of general hash values generated using a general hash function.

In an embodiment, accessing the open-source database includes: downloading the plurality of reference open-source software packages from an open-source providing server; classifying the plurality of reference open-source software packages based on each version of the reference open-source software packages in order to store the classified plurality of reference open-source software packages; building each of the classified plurality of reference open-source software packages to generate the plurality of reference binary files; and generating the open-source database based on the generated plurality of reference binary files.

In an embodiment, building each of the classified plurality of reference open-source software packages includes building each of the plurality of reference open-source software packages in each of a plurality of central processing unit (CPU) architectures and a plurality of operating systems (OSs).

In an embodiment, the plurality of CPU architectures includes Intel, ARM, Motorola, MIPS, and power architecture (PowerPC) CPUs.

In an embodiment, the plurality of OSs includes Linux, Unix, Windows, MacOS, Android, and iOS.

In an embodiment, extracting the at least two first hash values corresponding to the plurality of second hash values includes: determining whether the open-source database includes at least two general hash values of the first hash values which match the extracted at least two general hash values of the second hash values; and extracting the at least two general hash values of the first hash values from the open-source database, if it is determined that the open-source database includes the at least two general hash values of the first hash values which match the extracted at least two general hash values of the second hash values.

In an embodiment, identifying the reference open-source software package corresponding to the at least two first hash values includes detecting the reference open-source software package from the open-source database based on the at least two general hash values of the first hash values.

In an embodiment, each of the plurality of first hash values and the plurality of second hash values includes a similarity hash value generated using a similarity-based hash function, and the open-source database further includes a file name of each of the plurality of reference binary files and reference open-source software package information.

In an embodiment, the reference open-source software package information includes reference open-source software package names and reference open-source software package version information.

In an embodiment, extracting the at least two first hash values corresponding to the plurality of second hash values includes: determining whether the open-source database includes at least one reference binary file, among the plurality of reference binary files, having a file name which matches a file name of the target binary file, if it is determined that the open-source database does not include the at least two general hash values matching the extracted at least two general hash values; and extracting at least one similarity hash value associated with the at least one reference binary file having the matching file name from the open-source database, if it is determined that the open-source database includes the at least one reference binary file having the file name which matches the file name of the target binary file.

In an embodiment, identifying the reference open-source software package corresponding to the at least two first hash values includes: calculating similarities between a similarity hash value of the target binary file and the extracted at least one similarity hash value; identifying, among the extracted at least one similarity hash value, a similarity hash value that is equal to or greater than a predetermined threshold value and has the highest similarity among the calculated similarities; and detecting the open-source software package associated with the identified similarity hash value.

In an embodiment, identifying the reference open-source software package corresponding to the at least two first hash values includes: calculating similarities between each of a plurality of similarity hash values included in the open-source database and the similarity hash value of the target binary file, if it is determined that the open-source database does not include the at least one reference binary file having the file name which matches the file name of the target binary file; identifying, among the plurality of similarity hash values, a similarity hash value that is equal to or greater than a predetermined threshold value and has the highest similarity among the calculated similarities; and detecting the open-source software package associated with the identified similarity hash value.

In an embodiment, extracting the plurality of second hash values including the at least two general hash values from the target binary file includes: identifying a file type of the target binary file; and extracting the plurality of second hash values from the target binary file according to the file type.

According to another aspect of the present disclosure, there is provided a system for identifying an open-source software package from a target binary file for which an open-source license is to be checked. The system includes: a storage unit storing an open-source database generated to include a plurality of reference open-source software packages having a plurality of reference open-source files and to include a plurality of reference binary files, based on a plurality of first hash values extracted from the plurality of reference binary files generated from the plurality of reference open-source files; a reception unit configured to receive the target binary file; a processor configured to extract a plurality of second hash values including at least two general hash values from the target binary file, extract at least two first hash values corresponding to the plurality of second hash values among the plurality of first hash values included in the open-source database, and identify a reference open-source software package corresponding to the at least two first hash values based on the open-source database, among the plurality of reference open-source software packages; and an output unit configured to output the identified reference open-source software package.

In an embodiment, each of the plurality of first hash values and the plurality of second hash values includes a plurality of general hash values generated using a general hash function.

In an embodiment, the processor is configured to: download the plurality of reference open-source software packages from an open-source providing server; classify the plurality of reference open-source software packages based on each version of the reference open-source software packages in order to store the classified plurality of reference open-source software packages; build each of the classified plurality of reference open-source software packages to generate the plurality of reference binary files; and generate the open-source database based on the generated plurality of reference binary files.

In an embodiment, the processor is configured to build each of the plurality of reference open-source software packages in each of a plurality of CPU architectures and a plurality of OSs.

In an embodiment, the plurality of CPU architectures comprises Intel, ARM, Motorola, MIPS, and power architecture (PowerPC) CPUs.

In an embodiment, the plurality of OSs comprises Linux, Unix, Windows, MacOS, Android, and iOS.

In an embodiment, the processor is configured to: determine whether the open-source database includes at least two general hash values of the first hash values which match the extracted at least two general hash values of the second hash values; and extract the at least two general hash values of the first hash values from the open-source database, if it is determined that the open-source database includes the at least two general hash values of the first hash values which match the extracted at least two general hash values of the second hash values.

In an embodiment, the processor is configured to detect the reference open-source software package from the open-source database based on the at least two general hash values of the first hash values.

In an embodiment, each of the plurality of first hash values and the plurality of second hash values includes a similarity hash value generated using a similarity-based hash function, and the open-source database further includes a file name of each of the plurality of reference binary files and reference open-source software package information.

In an embodiment, the reference open-source software package information comprises reference open-source software package names and reference open-source software package version information.

In an embodiment, the processor is configured to: determine whether the open-source database includes at least one reference binary file, among the plurality of reference binary files, having a file name which matches a file name of the target binary file, if it is determined that the open-source database does not include the at least two general hash values matching the extracted at least two general hash values; and extract at least one similarity hash value associated with the at least one reference binary file having the matching file name from the open-source database, if it is determined that the open-source database includes the at least one reference binary file having the file name which matches the file name of the target binary file.

In an embodiment, the processor is configured to: calculate similarities between a similarity hash value of the target binary file and the extracted at least one similarity hash value; identify, among the extracted at least one similarity hash value, a similarity hash value that is equal to or greater than a predetermined threshold value and has the highest similarity among the calculated similarities; and detect the open-source software package associated with the identified similarity hash value.

In an embodiment, the processor is configured to: calculate similarities between each of a plurality of similarity hash values included in the open-source database and the similarity hash value of the target binary file, if it is determined that the open-source database does not include the at least one reference binary file having the file name which matches the file name of the target binary file; identify, among the plurality of similarity hash values, a similarity hash value that is equal to or greater than a predetermined threshold value and has the highest similarity among the calculated similarities; and detect the open-source software package associated with the identified similarity hash value.

In an embodiment, the processor is configured to: identify a file type of the target binary file; and extract the plurality of second hash values from the target binary file according to the file type.

According to various embodiments of the present disclosure, even after a source code file of open-source software is compiled to generate a binary file, an open-source software package and open-source software package version information used in the binary file may be identified based on a plurality of hash values extracted from the binary file.

In addition, based on the identified open-source software package and open-source software package version information, license information of the open-source software corresponding to the binary file may be provided.

BRIEF DESCRIPTION OF THE DRAWINGS

FIG. 6 illustrates similarity hash values and similarities according to an embodiment of the present disclosure.

DETAILED DESCRIPTION

Figures 1, 2:
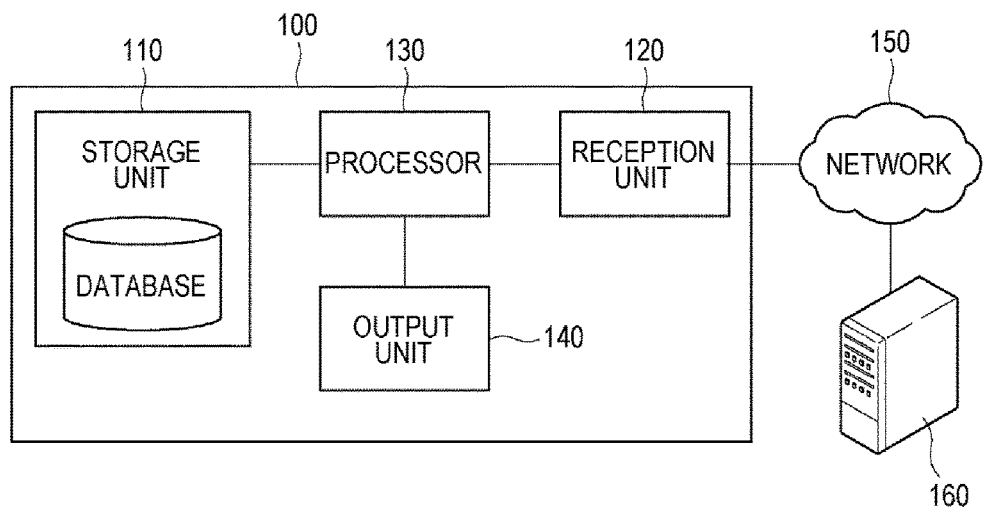
FIG. 1 is a block diagram schematically illustrating the configuration of an open-source identification system according to an embodiment of the present disclosure.
FIG. 2 illustrates an open-source database according to an embodiment of the present disclosure.

Embodiments of the present disclosure are illustrated for describing the technical concepts of the present disclosure. The scope of the claims according to the present disclosure is not limited to the embodiments described below or to detailed descriptions of these embodiments.

All technical or scientific terms used herein have meanings that are generally understood by a person having ordinary knowledge in the art to which the present disclosure pertains, unless otherwise specified. The terms used herein are selected to more clearly illustrate the present disclosure, and are not intended to limit the scope of claims in accordance with the present disclosure.

The expressions "include," "provided with," "have," and the like used herein should be understood as open-ended terms connoting the possibility of inclusion of other embodiments, unless otherwise mentioned in a phrase or sentence including the expressions.

A singular expression can include meanings of plurality, unless otherwise mentioned, and the same is applied to a singular expression stated in the claims.

The terms "first," "second," etc. used herein are used to distinguish a plurality of components from one another, and are not intended to limit the order or importance of the relevant components.

The term "unit" used herein means a software component or hardware component, such as a field-programmable gate array (FPGA) and an application specific integrated circuit (ASIC). However, a "unit" is not limited to software and hardware, and may be configured to be an addressable storage medium or may be configured to run on one or more processors. Accordingly, as an example, a "unit" may include components, such as software components, object-oriented software components, class components, and task components, as well as processors, functions, attributes, procedures, subroutines, segments of program codes, drivers, firmware, micro-codes, circuits, data, databases, data structures, tables, arrays, and variables. Functions provided in components and "unit" may be combined into a smaller number of components and "units" or further subdivided into additional components and "units."

The expression "based on" used herein is used to describe one or more factors that influence a decision, an action of judgment or an operation described in a phrase or sentence including the relevant expression, and this expression does not exclude an additional factor influencing the decision, the action of judgment or the operation.

When a certain component is described as "coupled to" or "connected to" another component, this should be understood as meaning that the certain component may be coupled or connected directly to the other component or that the certain component may be coupled or connected to the other component via a new intervening component.

In the present disclosure, the term "open source" refers to software or a software license that allows a third party to view the source code of the software while maintaining the rights of the original author of the corresponding software or hardware. In describing various embodiments of the present disclosure, the terms "open source," "open-source software" and "open-source software package" may be used interchangeably in the same or similar sense. In addition, in the present disclosure, the term "open-source file" (or open-source code file) refers to a file including computer program source code written in an arbitrary programming language and the use of which is governed by an open-source license. The term "open-source software package" (or open source package) refers to a software package or product constituted of one or more open-source files.

Hereinafter, embodiments of the present disclosure will be described with reference to the accompanying drawings. In the accompanying drawings, like or corresponding components are indicated by like reference numerals. In the following description of embodiments, repeated descriptions of identical or corresponding components may be omitted. However, even if a description of a component is omitted, such a component is not intended to be excluded in an embodiment.

FIG. 1 is a block diagram schematically illustrating a configuration of an open-source identification system according to an embodiment of the present disclosure. Referring to FIG. 1, an open-source identification system 100 includes a storage unit 110, a reception unit 120, a processor 130, and an output unit 140.

The storage unit 110 stores an open-source database. The open-source database is generated to include a plurality of reference open-source software packages including a plurality of reference open-source files and a plurality of reference binary files based on a plurality of first hash values. The plurality of reference binary files is generated from the plurality of reference open-source files, and the plurality of first hash values is extracted from the plurality of reference binary files. In addition, the storage unit 110 may store open-source license information corresponding to each of the plurality of open-source software packages and the open-source software package version information.

In an embodiment, the reference open-source software packages may be provided from an open-source providing server 160. The open-source providing server 160 is connected to the open-source identification system 100 via a network 150. For example, the network 150 may include both a wired network and a wireless network. The wired network includes the Internet, a dedicated line, and the like. Further, the wireless network includes a wireless Internet, a mobile communication network, a satellite communication network, and the like. In addition, the open-source providing server 160 includes a server providing Linux-kernel open-source software packages (for example, Linux-kernel open-source (https://www.kernel.org)), a server providing OpenSSL open-source software packages (For example, GitHub (https://github.com/openssl/openssl)), and the like.

In an embodiment, the reference binary files may be provided from the open-source providing server 160, which is connected to the open-source identification system 100 via the network 150. In another embodiment, the reference binary files may be generated by compiling each of a plurality of open-source files included in the plurality of reference open-source software packages downloaded from the open-source providing server 160.

In an embodiment, the reference binary files may be generated by building the open-source files on each of a plurality of CPU architectures and a plurality of operating systems (OSs). For example, the plurality of CPU architectures includes Intel, ARM, Motorola, MIPS, and power architecture (PowerPC) CPUs, and the plurality of OSs includes Linux, Unix, Windows, MacOS, Android, and iOS.

In the present disclosure, a "hash value" of a binary file is a value generated by applying a hash function to the binary file. Further, the "hash value" may refer to information or data for identifying a license or license version granted to open-source software (or an open-source software package) including an open-source file used in the binary file.

In an embodiment, each of the first hash values may include at least two general hash values generated using at least two general hash functions (e.g., SHA 128, SHA 256, MD5, etc.). In addition, each of the first hash values may include a similarity hash value generated using a similarity-based hash function (e.g., TLSH, sdHash, etc.).

In an embodiment, the open-source database stored in the storage unit 110 may be generated based on open-source software package information. The open-source software package information may be extracted from the plurality of reference open-source software packages.

FIG. 2 illustrates the open-source database according to an embodiment of the present disclosure. Referring to FIG. 2, the open-source database may include the first hash values, the file names of the reference binary files, and the reference open-source software package information. In an embodiment, the reference open-source software package information may include the reference open-source software package names, the reference open-source software package version information, and the like.

In an embodiment, the storage unit 110 may include a magnetic disk (e.g., magnetic tape, flexible disk, and hard disk), an optical disk (e.g., CD, DVD, etc.), a semiconductor memory (e.g., RAM, ROM, flash memory, USB or SD card including a flash memory, etc.), and the like. However, it may not be limited thereto.

The reception unit 120 receives a target binary file for which an open-source license is to be checked. In an embodiment, the reception unit 120 may connect to an external server (e.g., the server 160) that provides the target binary file. Further, the reception unit 120 may download the target binary file from the external server. In another embodiment, the reception unit 120 may connect to an external storage medium (not shown) in which the target binary file is stored. Further, the reception unit 120 may download the target binary file from the storage medium.

The processor 130 receives the target binary file from the reception unit 120. Further, the processor 130 extracts a plurality of second hash values from the received target binary file. In an embodiment, each of the second hash values may include at least two general hash values. The at least two general hash values are generated using at least two general hash functions (e.g., SHA 128, SHA 256, MD5, etc.). In addition, the each of the second hash values may include a similarity hash value generated using a similarity-based hash function (e.g., TLSH, sdHash, etc.). Further, the processor 130 extracts at least two first hash values corresponding to the plurality of second hash values among the plurality of first hash values included in the open-source database. Further, the processor 130 identifies a reference open-source software package corresponding to the at least two first hash values based on the open-source database. In addition, the processor 130 may detect open-source license information corresponding to the identified reference open-source software package. Furthermore, the processor 130 may control the operations of the storage unit 110, the reception unit 120, and the output unit 140.

In an embodiment, the processor 130 may be a processor capable of executing the above-described processing or control operations, or program instructions for executing such operations. The processor 130 may include any one of a central processing unit (CPU), a field-programmable gate array (FPGA), an application-specific integrated circuit (ASIC), a graphic processing unit (GPU), an application processor (AP), and the like, but may not be limited thereto.

The output unit 140 outputs the reference open-source software package identified by the processor 130 and the version information of the corresponding reference open-source software package. In addition, the output unit 140 may output the open-source license information detected by the processor 130.

In an embodiment, the output unit 140 may include a display which is capable of visually displaying the reference open-source software package, the reference open-source software package version information, the open-source license information or the like, a speaker which is capable of outputting such information acoustically, and the like. However, it may not be limited thereto.

Figure 3:
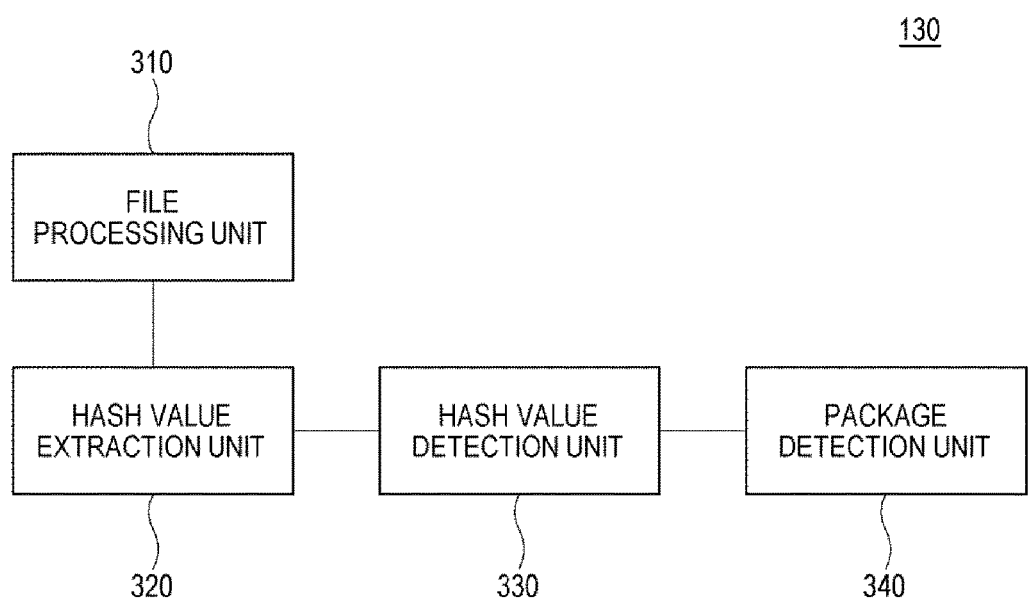
FIG. 3 is a block diagram schematically illustrating the configuration of a processor according to an embodiment of the present disclosure.

FIG. 3 is a block diagram schematically illustrating the configuration of a processor according to an embodiment of the present disclosure. Referring to FIG. 3, the processor 130 includes a file processing unit 310, a hash value extraction unit 320, a hash value detection unit 330, and a package detection unit 340.

The file processing unit 310 is connected to the reception unit 120 and receives a target binary file from the reception unit 120. In addition, the file processing unit 310 analyzes the file type of the received target binary file. When the file processing unit 310 determines that the target binary file is a compressed target binary file by analyzing the file type, the file processing unit 310 performs decompression processing on the target binary file.

The hash value extraction unit 320 is connected to the file processing unit 310 and receives the target binary file from the file processing unit 310. In addition, the hash value extraction unit 320 extracts a second hash value from the received target binary file. In an embodiment, the hash value extraction unit 320 extracts at least two general hash values by applying, to the target binary file, at least two general hash functions applied to a reference binary file. In addition, the hash value extraction unit 320 extracts a similarity hash value by applying, to the target binary file, a similarity-based hash function applied to the reference binary file.

The hash value detection unit 330 is connected to the hash value extraction unit 320 and receives the second hash value from the hash value extraction unit 320. In addition, the hash value detection unit 330 extracts at least two first hash values corresponding to the second hash value among the plurality of first hash values included in the open-source database.

In an embodiment, the hash value detection unit 330 detects at least two general hash values from the open-source database stored in the storage unit 110. The at least two general hash values match the at least two general hash values extracted by the hash value extraction unit 320.

In an embodiment, the hash value detection unit 330 detects at least one reference binary file having a file name, which matches the file name of the target binary file, from the open-source database stored in the storage unit 110. Further, the hash value detection unit 330 detects at least one similarity hash value associated with the detected at least one reference binary file.

In an embodiment, the hash value detection unit 330 detects a plurality of similarity hash values from the open-source database stored in the storage unit 110. For example, the hash value detection unit 330 detects all the similarity hash values included in the open-source database.

The package detection unit 340 is connected to the hash value detection unit 330 and receives the at least two first hash values from the hash value detection unit 330. The package detection unit 340 identifies a reference open-source software package corresponding to the at least two first hash values based on the open-source database.

In an embodiment, the package detection unit 340 detects the reference open-source software package from the open-source database, based on the at least two general hash values. The at least two general hash values match at least two general hash values of the target binary file. For example, the package detection unit 340 detects, from the open-source database stored in the storage unit 110, a reference open-source software package associated with the at least two general hash values that match the at least two general hash values of the target binary file as the reference open-source software package corresponding to the target binary file.

In an embodiment, the package detection unit 340 calculates similarities between a similarity hash value of the target binary file and at least one similarity hash value extracted from the open-source database. In addition, the package detection unit 340 identifies a similarity hash value that is equal to or greater than a predetermined threshold value and has the highest similarity among the calculated similarities. Further, the package detection unit 340 detects the reference open-source software package associated with the identified similarity hash value.

Figure 4:
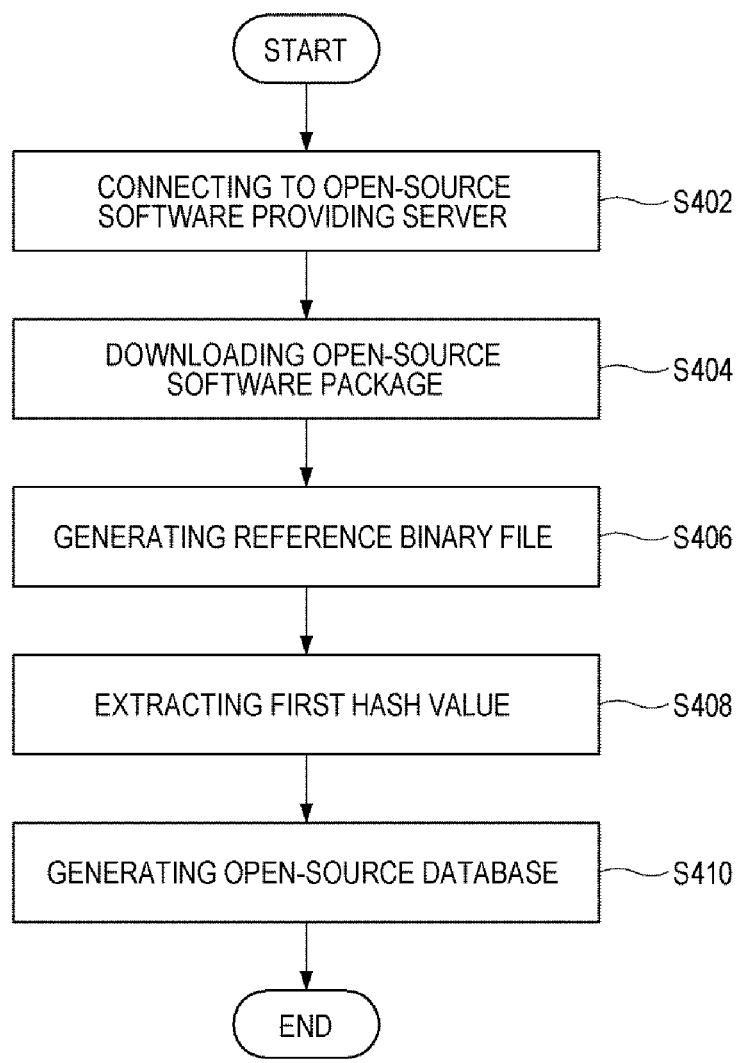
FIG. 4 is a flowchart illustrating a method of generating the open-source database according to an embodiment of the present disclosure.

FIG. 4 is a flowchart illustrating a method of generating an open-source database according to an embodiment of the present disclosure. Although process steps, method steps, algorithms, etc. are illustrated in a sequential order in the flowchart shown in FIG. 4, such processes, methods, and algorithms may be configured to be operated in any suitable order. In other words, the steps in the processes, methods, and algorithms explained in various embodiments of the present disclosure are not necessarily performed in the order described in the present disclosure. Further, even though some steps are explained as being performed non-simultaneously, such steps may be simultaneously performed in another embodiment. Moreover, the illustration of the processes depicted in the figure does not mean that the illustrated processes exclude other changes and modifications thereto, that any of the illustrated processes or the steps thereof is essential for at least one of various embodiments of the present disclosure, and that the illustrated processes are desirable.

Referring to FIG. 4, in step S402, the open-source identification system 100 is connected to the open-source providing server. In step S404, a plurality of reference open-source software packages is downloaded from the open-source providing server. For example, the processor 130 is connected to the open-source providing server 160 through the reception unit 120, and downloads the plurality of reference open-source software packages from the connected open-source providing server 160.

In step S406, a plurality of reference binary files is generated based on the plurality of reference open-source software packages. For example, the processor 130 classifies the plurality of reference open-source software packages for each of the versions of the reference open-source software packages. In addition, the processor 130 builds each of the plurality of reference open-source software packages classified for each of the versions of the reference open-source software packages to generate the plurality of reference binary files. In an embodiment, the processor 130 may build each of a plurality of open-source files in each of a plurality of CPU architectures and a plurality of OSs to generate the reference binary files.

In step S408, a plurality of first hash values is extracted from each of the plurality of reference binary files. For example, the processor 130 extracts the plurality of first hash values by applying a plurality of hash functions to each of the plurality of reference binary files.

In an embodiment, the processor 130 may extract at least two general hash values by applying at least two general hash functions (e.g., SHA128, SHA256, MD5, etc.) to each of the plurality of reference binary files. In addition, the processor 130 may extract a similarity hash value by applying a similarity-based hash function (e.g., TLSH, sdHash, etc.) to each of the plurality of reference binary files.

In step S410, an open-source database is generated based on the plurality of first hash values. For example, the processor 130 generates the open-source database. The open-source database includes the reference open-source software package names, the reference open-source software package version information, the reference binary file names and the first hash values, as shown in FIG. 2. The generated open-source database may be stored in the storage unit 110.

Figure 5:
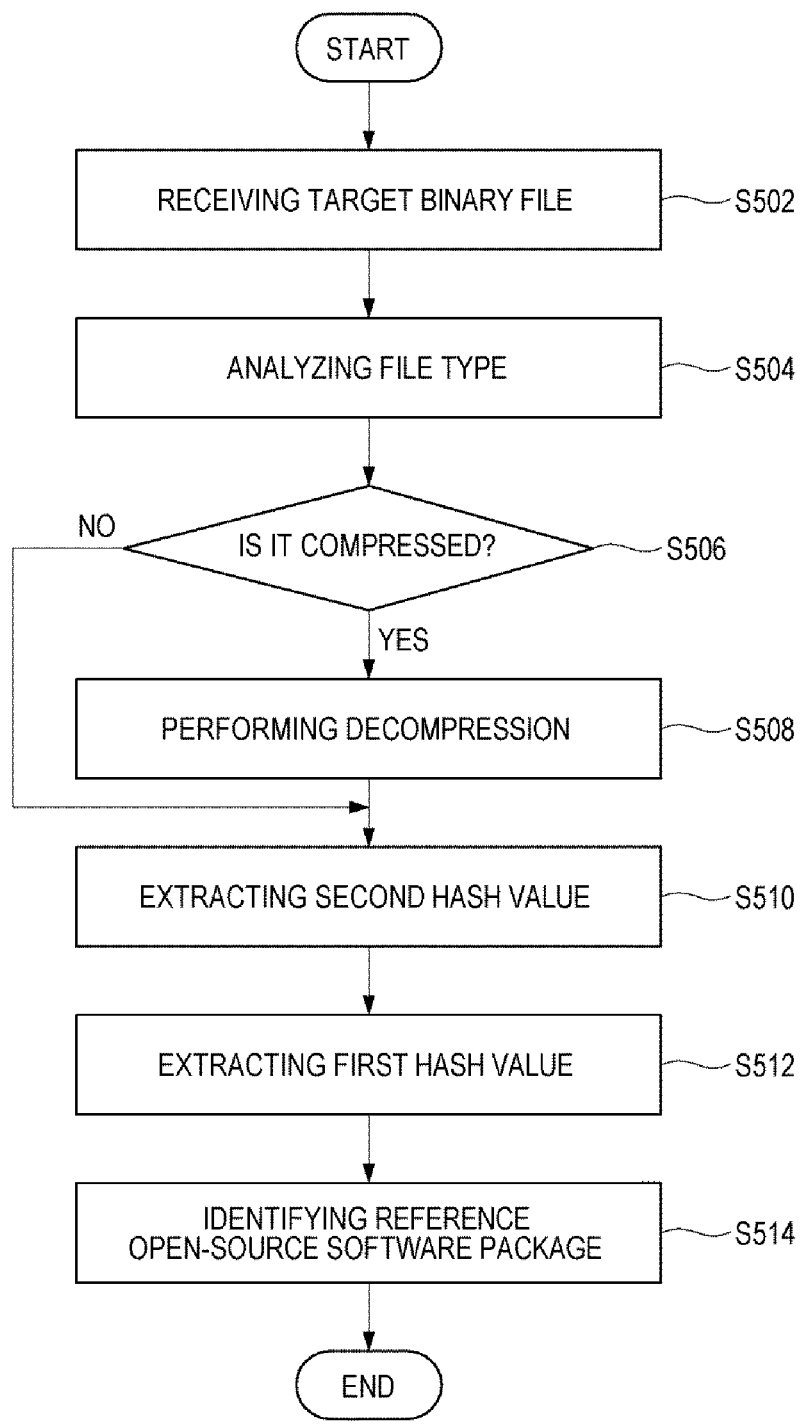
FIG. 5 is a flowchart illustrating a method of identifying a reference open-source software package corresponding to a binary file according to an embodiment of the present disclosure.

FIG. 5 is a flowchart illustrating a method of identifying a reference open-source software package corresponding to a target binary file according to an embodiment of the present disclosure. Although process steps, method steps, algorithms, etc. are illustrated in a sequential order in the flowchart shown in FIG. 5, such processes, methods, and algorithms may be configured to be operated in any suitable order. In other words, the steps in the processes, methods, and algorithms explained in various embodiments of the present disclosure are not necessarily performed in the order described in the present disclosure. Further, even though some steps are explained as being performed non-simultaneously, such steps may be simultaneously performed in another embodiment. Moreover, the illustration of the processes depicted in the figure does not mean that the illustrated processes exclude other changes and modifications thereto, that any of the illustrated processes or the steps thereof is essential for at least one of various embodiments of the present disclosure, and that the illustrated processes are desirable.

Referring to FIG. 5, in step S502, a target binary file is received. For example, the processor 130 receives the target binary file for which an open-source license is to be checked from an external server or a storage medium through the reception unit 120.

In step S504, the file type of the received target binary file is analyzed. In step S506, it is determined whether the target binary file is a compressed file or not. For example, the processor 130 analyzes the file type of the received target binary file and determines whether the target binary file is a compressed file or not.

If it is determined that the target binary file is a compressed file in step S506, decompression processing is performed on the target binary file in step S508. For example, the processor 130 performs decompression processing on the target binary file according to a compression type of the target binary file (e.g. zip, rar, etc.).

In step S510, a plurality of second hash values is extracted from the target binary file. For example, the processor 130 extracts the plurality of second hash values which include at least two general hash values and a similarity hash value from the target binary file. In an embodiment, the processor 130 may extract the at least two general hash values by applying, to the target binary file, at least two general hash functions (e.g., SHA 128, SHA 256, MD5, etc.) applied to the reference binary file. In addition, the processor 130 may extract the similarity hash value by applying, to the target binary file, a similarity-based hash function (e.g., TLSH, sdHash, etc.), applied to the reference binary file.

In step S512, at least two first hash values corresponding to the plurality of second hash values among a plurality of first hash values included in an open-source database are extracted. For example, the processor 130 extracts the at least two first hash values corresponding to the plurality of second hash values extracted from the target binary file, among the plurality of first hash values included in the open-source database.

In an embodiment, the processor 130 determines whether the open-source database stored in the storage unit 110 includes at least two general hash values that match the at least two general hash values extracted from the target binary file. If it is determined that the open-source database includes at least two general hash values which match the at least two general hash values extracted from the target binary file, the processor 130 extracts, from the open-source database stored in the storage unit 110, the at least two general hash values matching the at least two general hash values extracted from the target binary file.

In an embodiment, if it is determined that the open-source database does not include at least two general hash values that match the at least two general hash values extracted by the hash value extraction unit 320, the processor 130 determines whether the open-source database includes at least one reference binary file having a file name that matches the file name of the target binary file. If it is determined that the open-source database includes at least one reference binary file having a file name that matches the file name of the target binary file, the processor 130 extracts at least one similarity hash value associated with the at least one reference binary file having the file name which matches the file name of the target binary file from the open-source database.

In an embodiment, if it is determined that the open-source database does not include the at least one reference binary file having the file name matching the file name of the target binary file, the processor 130 extracts all the similarity hash values included in the open-source database.

In step S514, a reference open-source software package corresponding to the at least two first hash values is identified based on the open-source database. For example, the processor 130 identifies the reference open-source software package (e.g., a reference open-source software package name) corresponding to the at least two first hash values, based on the open-source database stored in storage unit 110. The identified reference open-source software package and version information corresponding to the identified reference open-source software package may be output through the output unit 140.

In an embodiment, the processor 130 detects the reference open-source software package from the open-source database based on the at least two matching general hash values. For example, the processor 130 detects the reference open-source software package associated with the at least two matching general hash values from the open-source database.

In an embodiment, the processor 130 calculates similarities between the similarity hash value of the target binary file and the extracted at least one similarity hash value. The processor 130 identifies a similarity hash value that is equal to or greater than a predetermined threshold value and has the highest similarity among the calculated similarities. The processor 130 detects a reference open-source software package name associated with the identified similarity hash value from the open-source database stored in the storage unit 110.

For example, as shown in FIG. 6, when the similarity hash value of the target binary file is "similarity hash value A" and the similarity hash values associated with the reference binary file having the file name that matches the file name of the target binary file are "similarity hash value B" to "similarity hash value F," the processor 130 calculates similarities between each of "similarity hash value B" to "similarity hash value F" and "similarity hash value A." The processor 130 identifies a similarity hash value that is equal to or greater than a predetermined threshold value (e.g., "80") and has the highest similarity among the calculated similarities. That is, the processor 130 detects similarities ("85," "80," "90") that are equal to or greater than the predetermined threshold value among the calculated similarities, and identifies the similarity hash value ("similarity hash value F") having the highest similarity ("90") among the detected similarities. The processor 130 detects, from the open-source database stored in the storage unit 110, a reference open-source software package name associated with the similarity hash value ("similarity hash value F") as a reference open-source software package name corresponding to the target binary file.

In an embodiment, the processor 130 calculates similarities between each of the similarity hash values included in the open-source database and the similarity hash value of the target binary file. The processor 130 identifies the similarity hash value that is equal to or greater than the predetermined threshold value and has the highest similarity among the calculated similarities. The processor 130 detects, from the open-source database stored in the storage unit 110, the reference open-source software package name associated with the identified similarity hash value.

Additionally or alternatively, the processor 130 may extract open-source license information corresponding to the reference open-source software package from the open-source database stored in the storage unit 110, and may output the extracted open-source license information through the output unit 140.

While the foregoing methods have been described with respect to particular embodiments, these methods may also be implemented as computer-readable code on a computer-readable recording medium. The computer-readable recoding medium includes any kind of data storage devices that can be read by a computer system. Examples of the computer-readable recording medium include ROM, RAM, CD-ROM, magnetic tape, floppy disk, optical data storage device and the like, and also include a medium implemented in the form of a carrier wave (e.g., transmission via Internet). Also, the computer-readable recoding medium can be distributed to computer systems connected through a network so that the computer-readable code can be stored and executed in a distributed manner. Further, functional programs, code and code segments for implementing the foregoing embodiments can easily be inferred by programmers in the art to which the present disclosure pertains.

Although the technical spirit of the present disclosure has been described by the examples described in some embodiments and illustrated in the accompanying drawings, it should be noted that various substitutions, modifications, and changes can be made without departing from the scope of the present disclosure which can be understood by those skilled in the art to which the present disclosure pertains. In addition, it should be noted that that such substitutions, modifications and changes are intended to fall within the scope of the appended claims.

What is claimed is:

1. A method for identifying an open-source software package from a target binary file for which an open-source license is to be checked, the method comprising:
    accessing an open-source database generated to include a plurality of reference open-source software packages having a plurality of reference open-source files and to include a plurality of reference binary files, based on a plurality of first hash values extracted from the plurality of reference binary files generated from the plurality of reference open-source files;
    receiving the target binary file;
    extracting a plurality of second hash values including at least two general hash values from the target binary file;
    extracting at least two first hash values, corresponding to the plurality of second hash values, among the plurality of first hash values included in the open-source database; and
    identifying a reference open-source software package, corresponding to the at least two first hash values based on the open-source database, among the plurality of reference open-source software packages,
    wherein each of the plurality of first hash values and the plurality of second hash values comprises a plurality of general hash values generated using a general hash function and a similarity hash value generated using a similarity-based hash function, and
    wherein the step of extracting the at least two first hash values, corresponding to the plurality of second hash values, comprises:
        determining whether the open-source database includes at least two general hash values of the first hash values which match at least two general hash values of the second hash values;
        extracting at least two general hash values of the first hash values from the open-source database, if it is determined that the open-source database includes the at least two general hash values of the first hash values matching the extracted at least two general hash values of the second hash values; and
        extracting at least one similarity hash value associated with at least one reference binary file based on a file name of the target binary file, if it is determined that the open-source database does not include the at least two general hash values matching the extracted at least two general hash values of the second hash values.

2. The method of claim 1, wherein the step of accessing the open-source database comprises:
    downloading the plurality of reference open-source software packages from an open-source providing server;
    classifying the plurality of reference open-source software packages based on each version of the reference open-source software packages in order to store the classified plurality of reference open-source software packages;
    building each of the classified plurality of reference open-source software packages to generate the plurality of reference binary files; and
    generating the open-source database based on the generated plurality of reference binary files.

3. The method of claim 2, wherein the step of building each of the classified plurality of reference open-source software packages comprises building each of the plurality of reference open-source software packages in each of a plurality of central processing unit (CPU) architectures and a plurality of operating systems (OSs).

4. The method of claim 3, wherein the plurality of CPU architectures comprises Intel, ARM, Motorola, MIPS, and power architecture (PowerPC) CPUs.

5. The method of claim 3, wherein the plurality of OSs comprises Linux, Unix, Windows, MacOS, Android, and iOS.

6. The method of claim 1, wherein the step of identifying the reference open-source software package corresponding to the at least two first hash values comprises detecting the reference open-source software package from the open-source database based on the at least two general hash values of the first hash values.

7. The method of claim 1, wherein the open-source database further comprises a file name of each of the plurality of reference binary files and reference open-source software package information.

8. The method of claim 7, wherein the reference open-source software package information comprises reference open-source software package names and reference open-source software package version information.

9. The method of claim 7, wherein the step of extracting the at least one similarity hash value associated with the at least one reference binary file comprises:
   determining whether the open-source database includes at least one reference binary file, among the plurality of reference binary files, having a file name which matches the file name of the target binary file; and
   extracting at least one similarity hash value associated with the at least one reference binary file having the matching file name from the open-source database, if it is determined that the open-source database includes the at least one reference binary file having the file name which matches the file name of the target binary file.

10. The method of claim 9, wherein the step of identifying the reference open-source software package corresponding to the at least two first hash values comprises:
   calculating similarities between a similarity hash value of the target binary file and the extracted at least one similarity hash value;
   identifying, among the extracted at least one similarity hash value, a similarity hash value that is equal to or greater than a predetermined threshold value and has the highest similarity among the calculated similarities; and
   detecting the open-source software package associated with the identified similarity hash value.

11. The method of claim 9, wherein the step of identifying the reference open-source software package corresponding to the at least two first hash values comprises:
   calculating similarities between each of a plurality of similarity hash values included in the open-source database and the similarity hash value of the target binary file, if it is determined that the open-source database does not include the at least one reference binary file having the file name which matches the file name of the target binary file;
   identifying, among the plurality of similarity hash values, a similarity hash value that is equal to or greater than a predetermined threshold value and has the highest similarity among the calculated similarities; and
   detecting the open-source software package associated with the identified similarity hash value.

12. The method of claim 1, wherein the step of extracting the plurality of second hash values including the at least two general hash values from the target binary file comprises:
   identifying a file type of the target binary file; and
   extracting the plurality of second hash values from the target binary file according to the file type.

13. A system for identifying an open-source software package from a target binary file for which an open-source license is to be checked, the system comprising:
   a storage unit storing an open-source database generated to include a plurality of reference open-source software packages having a plurality of reference open-source files and to include a plurality of reference binary files, based on a plurality of first hash values extracted from the plurality of reference binary files generated from the plurality of reference open-source files;
   a reception unit configured to receive the target binary file;
   a processor configured to extract a plurality of second hash values including at least two general hash values from the target binary file, extract at least two first hash values corresponding to the plurality of second hash values among the plurality of first hash values included in the open-source database, and identify a reference open-source software package corresponding to the at least two first hash values based on the open-source database, among the plurality of reference open-source software packages; and
   an output unit configured to output the identified reference open-source software package,
   wherein each of the plurality of first hash values and the plurality of second hash values comprises a plurality of general hash values generated using a general hash function and a similarity hash value generated using a similarity-based hash function, and
   wherein the processor is configured to:
      determine whether the open-source database includes at least two general hash values of the first hash values which match at least two general hash values of the second hash values;
      extract at least two general hash values of the first hash values from the open-source database, if it is determined that the open-source database includes the at least two general hash values of the first hash values matching the extracted at least two general hash values of the second hash values; and
      extract at least one similarity hash value associated with at least one reference binary file based on a file name of the target binary file, if it is determined that the open-source database does not include the at least two general hash values matching the extracted at least two general hash values of the second hash values.

14. The system of claim 13, wherein the processor is configured to:
   download the plurality of reference open-source software packages from an open-source providing server;
   classify the plurality of reference open-source software packages based on each version of the reference open-source software packages in order to store the classified plurality of reference open-source software packages;
   build each of the classified plurality of reference open-source software packages to generate the plurality of reference binary files; and
   generate the open-source database based on the generated plurality of reference binary files.

15. The system of claim 14, wherein the processor is configured to build each of the plurality of reference open-source software packages in each of a plurality of CPU architectures and a plurality of OSs.

16. The system of claim 15, wherein the plurality of CPU architectures comprises Intel, ARM, Motorola, MIPS, and power architecture (PowerPC) CPUs.

17. The system of claim 15, wherein the plurality of OSs comprises Linux, Unix, Windows, MacOS, Android, and iOS.

18. The system of claim 13, wherein the processor is configured to detect the reference open-source software package from the open-source database based on the at least two general hash values of the first hash values.

19. The system of claim 13, wherein the open-source database further comprises a file name of each of the plurality of reference binary files and reference open-source software package information.

20. The system of claim 19, wherein the reference open-source software package information comprises reference open-source software package names and reference open-source software package version information.

21. The system of claim 19, wherein the processor is further configured to:
  determine whether the open-source database includes at least one reference binary file, among the plurality of reference binary files, having a file name which matches the file name of the target binary file; and
  extract at least one similarity hash value associated with the at least one reference binary file having the matching file name from the open-source database, if it is determined that the open-source database includes the at least one reference binary file having the file name which matches the file name of the target binary file.

22. The system of claim 21, wherein the processor is further configured to:
  calculate similarities between a similarity hash value of the target binary file and the extracted at least one similarity hash value;
  identify, among the extracted at least one similarity hash value, a similarity hash value that is equal to or greater than a predetermined threshold value and has the highest similarity among the calculated similarities; and
  detect the open-source software package associated with the identified similarity hash value.

23. The system of claim 21, wherein the processor is further configured to:
  calculate similarities between each of a plurality of similarity hash values included in the open-source database and the similarity hash value of the target binary file, if it is determined that the open-source database does not include the at least one reference binary file having the file name which matches the file name of the target binary file;
  identify, among the plurality of similarity hash values, a similarity hash value that is equal to or greater than a predetermined threshold value and has the highest similarity among the calculated similarities; and
  detect the open-source software package associated with the identified similarity hash value.

24. The system of claim 13, wherein the processor is further configured to:
  identify a file type of the target binary file; and
  extract the plurality of second hash values from the target binary file according to the file type.

* * * * *